United States Patent
Yamauchi et al.

(10) Patent No.: US 9,112,247 B2
(45) Date of Patent: Aug. 18, 2015

(54) BATTERY SYSTEM

(75) Inventors: Shin Yamauchi, Mito (JP); Motoo Futami, Hitachiota (JP); Kenji Takeda, Mito (JP); Takeshi Uchida, Kasukabe (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 13/408,483

(22) Filed: Feb. 29, 2012

(65) Prior Publication Data

US 2012/0223677 A1  Sep. 6, 2012

(30) Foreign Application Priority Data

Mar. 1, 2011  (JP) ................................. 2011-044315

(51) Int. Cl.
  *H02J 7/00* (2006.01)
  *H01M 10/48* (2006.01)
  *H01M 10/42* (2006.01)
  *H02J 7/34* (2006.01)

(52) U.S. Cl.
  CPC .......... *H01M 10/482* (2013.01); *H01M 10/425* (2013.01); *H02J 7/0014* (2013.01); *H02J 7/34* (2013.01)

(58) Field of Classification Search
  CPC ...................... H01M 2010/4271; H02J 7/0014
  USPC .......... 320/116, 126, 132, 134, 136; 324/434
  See application file for complete search history.

(56) References Cited

U.S. PATENT DOCUMENTS

2010/0019724 A1  1/2010  Mizutani et al.
2011/0089897 A1*  4/2011  Zhang et al. .................. 320/116

FOREIGN PATENT DOCUMENTS

| EP | 2 148 384 A1 | 1/2010 |
| JP | 2010-29015 A | 2/2010 |
| JP | 2010-29050 A | 2/2010 |
| JP | 2010-166721 A | 7/2010 |
| JP | 2010-220280 A | 9/2010 |
| WO | WO 2004/049540 A2 | 6/2004 |
| WO | WO 2007/134320 A2 | 11/2007 |

OTHER PUBLICATIONS

European Search Report dated Jul. 9, 2012 (seven (7) pages).
Japanese Notification of Reasons for Refusal with English translation thereof Dated Jul. 16, 2013 {Seven (7) pages}.

* cited by examiner

*Primary Examiner* — Edward Tso
*Assistant Examiner* — Aaron Piggush
(74) *Attorney, Agent, or Firm* — Crowell & Moring LLP

(57) ABSTRACT

Even if requirements for any scale of system constructions occur, a battery system of flexibly responding to the requirements is provided. The battery system comprising a battery module having a plurality of battery cells being connected, a battery pack having a plurality of battery modules being connected either in series or in parallel or both in series and in parallel, and a battery block having a plurality of battery packs being connected either in series or in parallel or both in series and in parallel. They are mutually layered. In the battery system, the battery module, the battery pack, and the battery block are previously prepared as variations of layered basic units. In response to requirements for any scale of system constructions, the basic units are combined accordingly.

9 Claims, 11 Drawing Sheets

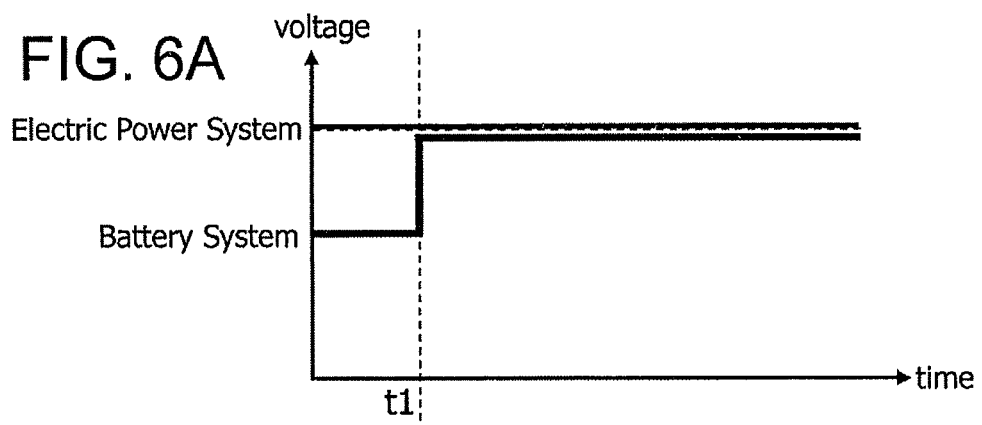
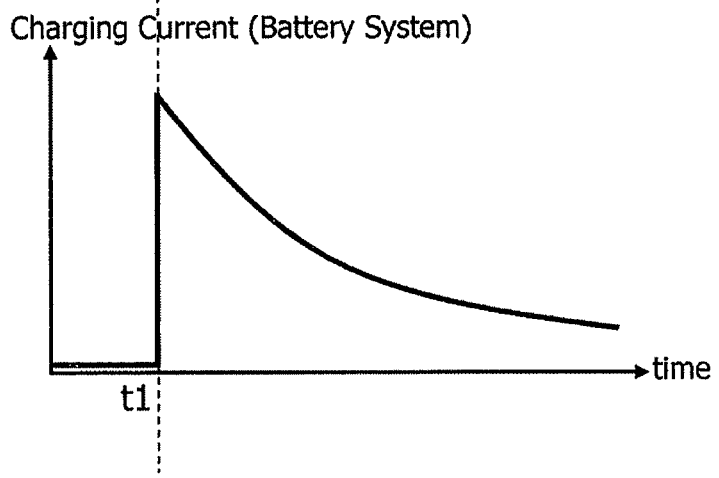

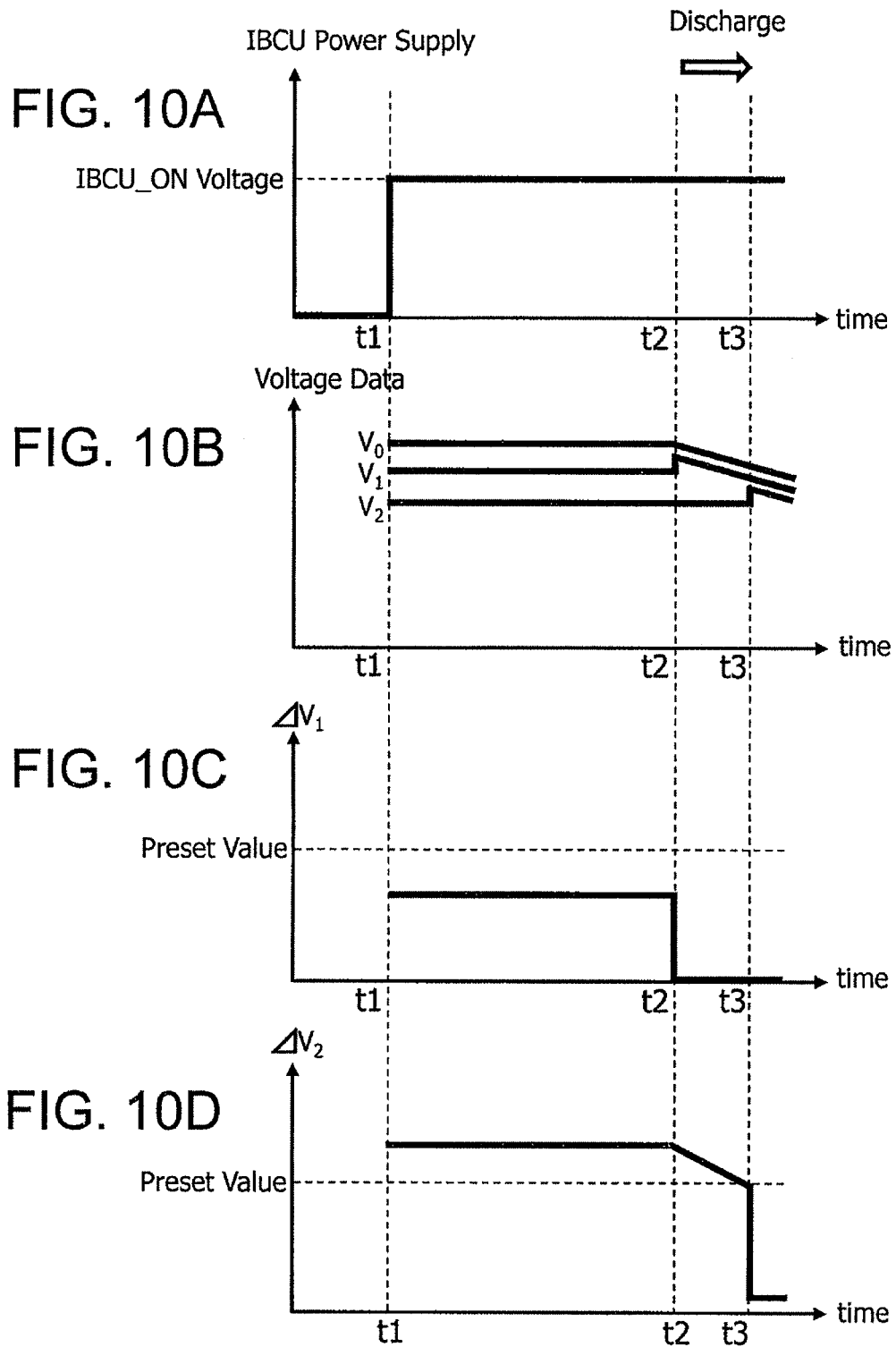

BATTERY SYSTEM

CROSS REFERENCE TO RELATED APPLICATIONS

The present application claims the foreign priority benefit (under 35 U.S.C. §119(a)-(d)) of Japanese Patent Application No. 2011-044315 filed on Mar. 1, 2011, in the Japan Patent Office, the disclosure of which is herein incorporated by reference in its entirety.

BACKGROUND OF THE INVENTION

1. Field of the Invention

This invention relates to a battery system with a battery module in which a plurality of battery cells are connected in series.

2. Description of the Related Art

A conventional battery system has been known in which a plurality of battery modules are connected in parallel one another, each battery module comprising a plurality of battery cells connected in series (e.g., JP 2010-029015A). The battery system in JP 2010-029015A has status detection circuits that are provided for respective battery modules arranged in parallel one another, so as to detect differences in electrical currents flowing through the battery modules. Based on the detected results the magnitude of the electrical currents that flow through respective battery modules is controlled by current control elements. According to the battery system in JP 2010-029015A, the differences in current among the battery modules may be decreased.

Recently, development and experimental introduction of a battery system for a power storage have steadily advanced. In such a situation, scalability of flexibly responding to requirements for various voltages and current capacities has been requested, in association with expanding applicable proposes of a battery system. However, the battery system in JP 2010-029015A cannot provide the scalability of flexibly responding to requirements for various voltages and current capacities.

SUMMARY OF THE INVENTION

This invention was conceived in view of the situations stated above. An object of this invention is to provide a battery system of flexibly responding to requirements for any scale of system constructions.

The battery system of this invention is predicated on a battery system that is constructed by mutually layering: a battery module comprising a plurality of battery cells being connected; a battery pack comprising a plurality of battery modules being connected either in series or in parallel or both in series and in parallel; and a battery block comprising a plurality of battery packs being connected either in series or in parallel or both in series and in parallel.

A battery system in accordance with this invention includes a cell control unit, a battery control unit and a pack control unit. The cell control unit calculates first differences among the plurality of battery cells either in electric energy or in a state of charge or both in electric energy and in a state of charge and operates to reduce the first differences among the plurality of battery cells based on a result calculated by the cell control unit regarding the first differences. The battery control unit calculates second differences among the plurality of battery modules either in electric energy or in a state of charge or both in electric energy and in a state of charge and performs a controlling operation to reduce the second differences among the plurality of battery modules based on a result calculated by the battery control unit regarding the second differences. Further, the pack control unit calculates third differences among the plurality of battery packs either in electric energy or in a state of charge or both in electric energy and in a state of charge and performs a controlling operation to reduce the third differences among the plurality of battery packs based on a result calculated by the pack control unit regarding the third differences.

According to this invention, even if requirements for any scale of system constructions occur, a battery system of flexibly responding to the requirements may be provided.

BRIEF DESCRIPTION OF THE DRAWING

FIG. 6A and FIG. 6B are views for explaining disadvantages of a comparative example to the battery system 205 in accordance with the second embodiment of this invention.

FIG. 10A, FIG. 10B, FIG. 10C and FIG. 10D are time charts related to the flowchart in FIG. 8.

DETAILED DESCRIPTION OF THE INVENTION

Battery systems 203 in accordance with a plurality of embodiments of this invention are below explained in reference to the drawings.

[Battery System 203 of a First Embodiment]

Figure 1:
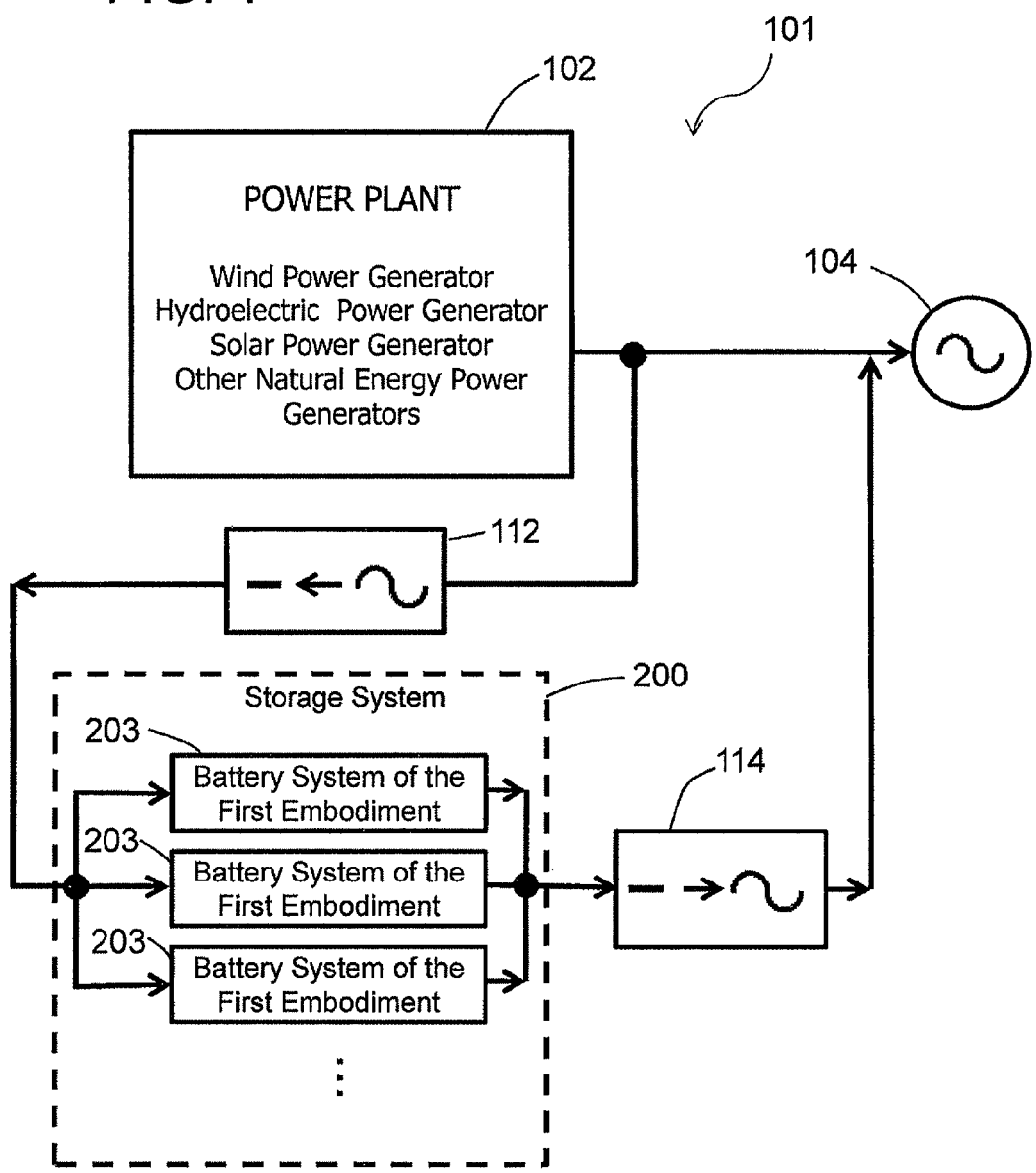
FIG. 1 is a functional block diagram showing an outline of a power generating system 101 to which a battery system 203 in accordance with a first embodiment of this invention is applied.
Figure 2:
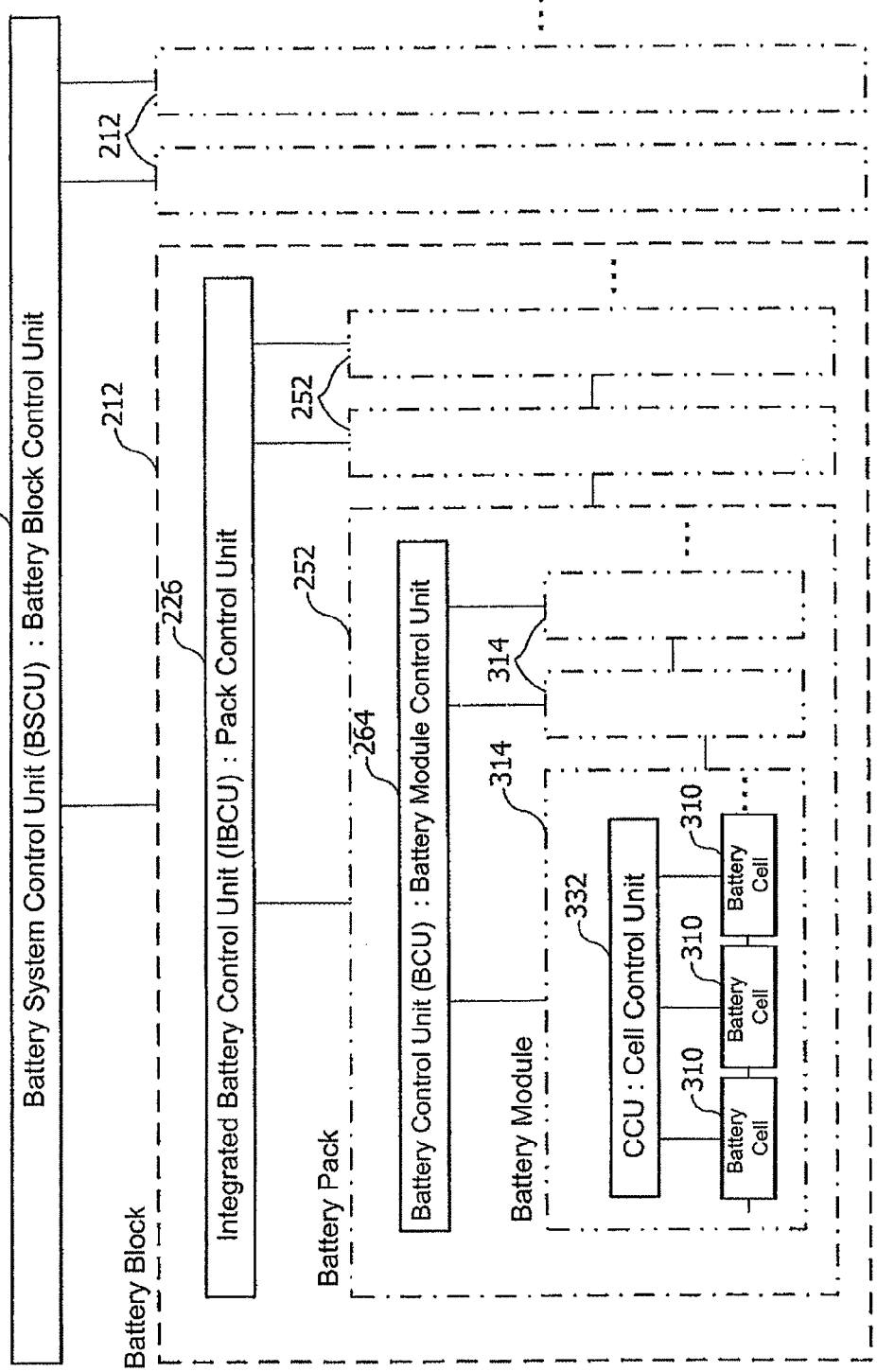
FIG. 2 is a functional block diagram showing a concept of a layered structure of the battery system 203 in accordance with the first embodiment of this invention.
Figure 3:
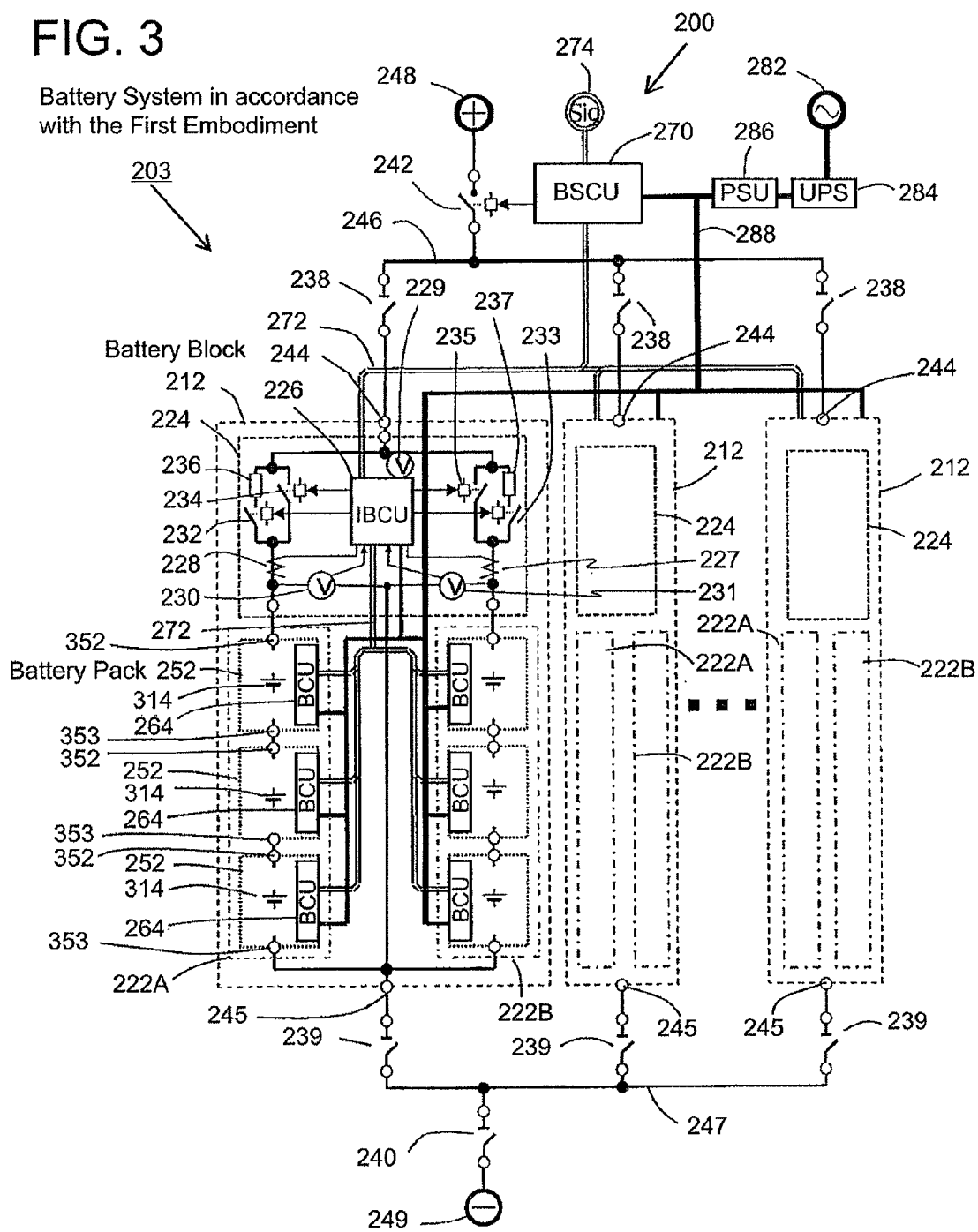
FIG. 3 is a view showing a circuit configuration of the battery system 203 in accordance with the first embodiment of this invention.
Figure 4:
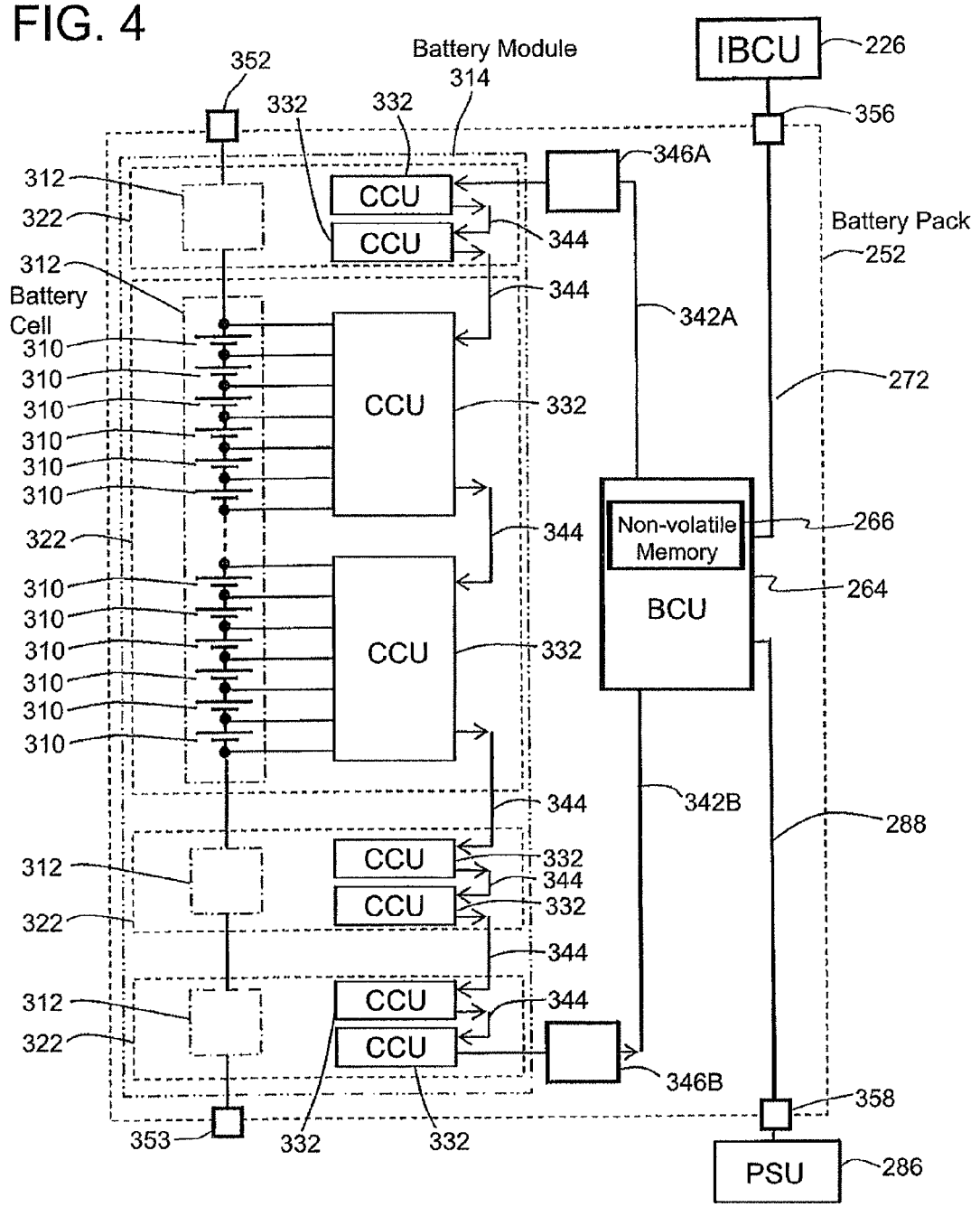
FIG. 4 is a view showing a circuit configuration that includes a battery pack 252 and surroundings thereof.

FIG. 1 is a functional block diagram of a power generating system 101 to which a battery system 203 in accordance with a first embodiment of this invention is applied. FIG. 2 is a functional block diagram showing a concept of a layered structure of the battery system 203 in accordance with the first embodiment of this invention. FIG. 3 is a view showing a circuit configuration of the battery system 203 in accordance with the first embodiment of this invention. FIG. 4 is a view showing a circuit configuration that includes a battery pack 252 and surroundings thereof. Prior to explaining the battery system 203 in accordance with the first embodiment of this invention, the power generating system 101 to which the battery system 203 is applied is explained.

[Power Generating System 101]

As in FIG. 1, the power generating system 101 includes a power plant 102, a power system 104, an A/D converter 112, an inverter 114, and a storage system 200. The power plant 102 may preferably include power generators using natural energy, such as a wind power generator by wind power, a hydroelectric power generator by hydroelectric power, and a solar power generator by solar power.

The power plant 102 using natural energy has an advantage that it provides little stress against natural environment, while the power generating performance thereof largely depends on natural environment. Thus, as in FIG. 1, the electric power generated by the power plant 102 is once stored in a storage system 200, and then the electric power stored is transmitted to a load (not shown) through the power system 104 in response to a demand for the load.

The storage system 200 has a function of storing direct-current power. Thus, the power generated by the power plant 102 is converted to direct-current power by the A/D converter 112. The direct-current power converted is then stored in the storage system 200. The power to a load is transmitted through the power system 104. Hence, the direct-current power that is stored in the storage system 200 is converted to alternate-current power by the inverter 114 and then supplied to a load through the power system 104.

[Storage System 200]

The storage system 200 includes the battery systems 203. The number of the battery systems 203 is determined when they are designed based on the predetermined storage capacity. The storage system 200 in FIG. 1 is an example including a number of battery systems 203. Details of respective battery systems 203 are discussed hereinafter in reference to FIG. 2 to FIG. 4.

By the way, power supply is closely related to a social life. Thus, such a situation should be avoided that the operation of the entire storage system 200 stops unless environment such as large-scale natural disaster exceptional occur. Thereupon, scheduled maintenances are implemented by sequentially stopping a part of the battery systems 203 without stopping the operation of the entire storage system 200. Also, when some of the battery systems 203 are repaired, only the intended battery systems 203 are stopped to execute necessary works for maintenances with keeping the whole operation of the storage system 200.

As will hereinafter be discussed in detail, each battery system 203 includes, as a component, a plurality of battery blocks 212. Here, it is assumed that some of the plurality of battery blocks 212 included in the battery system 203 falls in malfunction. In this case, only the battery blocks 212 having the malfunction are separated from the storage system 200 without separating the target battery system 203 from the storage system 200. Then, the separated battery blocks 212 are maintained (repaired or replaced, if necessary). This configuration allows both the safety related to maintenance and the convenience related to stable supply of power to be compatible.

[Technical Challenges, Resolving Means and Effects of Storage System 200]

The battery system 203 in accordance with the first embodiment of this invention is predicated on the storage system 200. Typical technical challenges, means for resolving them and effects for the storage system 200 are explained below.

(1) Downsizing Storage System 200

As in FIG. 3, the storage system 200 includes a plurality of battery blocks 212 in each of which a plurality of battery packs 252 are stacked. Each battery block 212 is stored in one battery block storage apparatus 412 having a cabinet type housing (see FIG. 5). This results in a downsizing of the whole storage system 200. The battery block storage apparatus 412 compactly stores component devices of the storage system 200, i.e., the battery block 212, as well as a battery system control unit (BSCU) 270, switches 242, and breakers 238 or the like. Thus, the whole of the storage system 200 may be decreased in size.

(2) Convenience and Operability of Storage System 200

Figure 5:
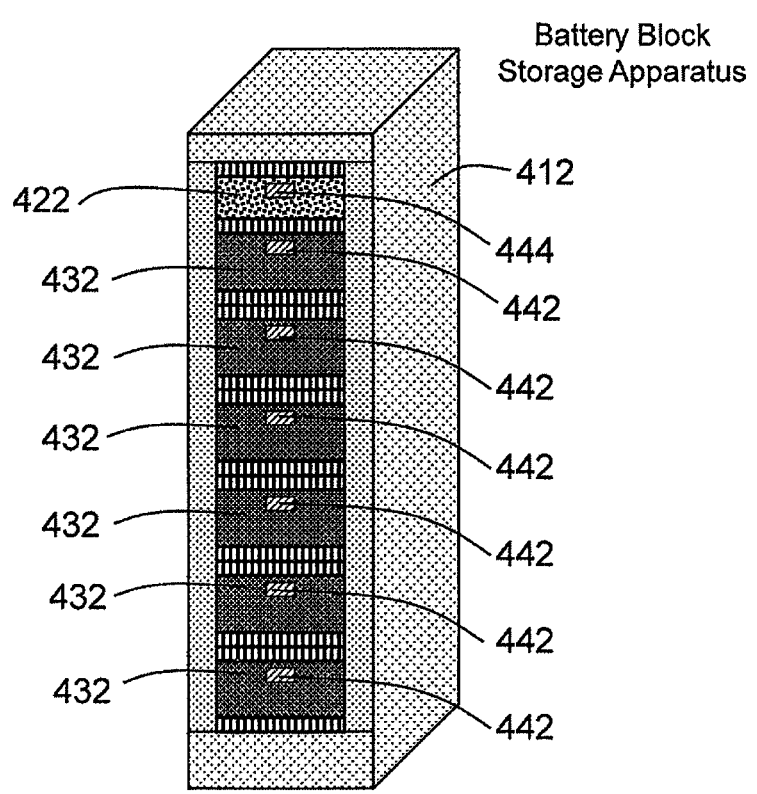
FIG. 5 is an outside view of a battery block storage apparatus 412 storing a battery block 212.

The storage system 200 includes display operation sections 442, as in FIG. 5. Each display operation section is used for displaying an operation condition of the battery pack 252 and for various setting up operations. Also, each display operation section 442 is arranged on the front side plate of a drawer case type of a pack storage housing 432. This results in the excellence in the convenience and operability of the storage system 200.

(3) Maintenance of Storage System 200

The storage system 200 is constructed such that a battery block 212 or a battery pack 252 may be attached to and removed from the storage system 200 as a component unit. Thus, the maintenance ability is superior.

(4) Safety at the Time of Battery Connection

In the storage system 200, an integrated battery control unit (IBCU) 226 executes a control operation to close breakers 238, 239, 240 and a switch 242 after making sure respective battery packs 252 are electrically connected. This allows high safety to be achieved.

[Battery System 203]

Then, the battery system 203 will be explained in detail in reference to FIG. 2 to FIG. 4.

FIG. 2 and FIG. 3 focus on a battery system 203 of a plurality of battery systems 203. All the battery systems 203 are in the same configuration. Thus, one of the battery systems 203 will be explained instead of explaining all of the battery systems 203.

Also, the storage system 200 may be comprised of only one battery system 203. In this case, the battery system 203 and the storage system 200 are the same in the configuration. Even in this case, each of the systems in FIG. 2 and FIG. 3 is called a battery system 203. Further, the battery system 203 may be comprised of component devices connected both in series and in parallel. Such a connected condition of the component devices may be called "they are connected in series and in parallel."

Some critical points in configuring the battery system 203 are explained below.

(1) As component devices of the battery system 203, a plurality of variations of layered basic units that are different in scale from each other are previously prepared. In the battery system 203 in accordance with the first embodiment, the battery module 314, the battery pack 252, and the battery block 212, which are arranged in order from a small scale to a large scale in the upper level direction, as in FIG. 2, correspond to variations of layered basic units, respectively.

(2) In another aspect, it is found that, as in FIG. 2 and FIG. 3, the battery system 203 includes the battery module 314 having a plurality of battery cells 310 being connected in series, the battery pack 252 having the battery modules 314 being connected in series and in parallel, and the battery block 212 having the battery packs 252 being connected in series and in parallel. They are mutually layered one another appropriately.

"Mutually layering variations of layered basic units" means that a magnitude relationship in scale between any adjacent layers is homothetic. That is, for example, it is supposed that a first basic unit, a second basic unit, and a third basic unit are arranged in sequence to mutually layer variations of layered basic units. In this case, the magnitude relationship in scale between the first basic unit and the second basic unit, and the magnitude relationship in scale between the second basic unit and the third basic unit are mutually fractal.

That will be verified based on the first embodiment. The first embodiment of the battery system 203 is arranged by the battery block 212 (or first basic unit), the battery pack 252 (or second basic unit), and the battery module 314 (or third basic unit), in order of magnitude from a large scale, thereby, to construct layered variations of layered basic units.

In that case, the magnitude relationship in scale between the battery block 212 (or first basic unit) and the battery pack 252 (or second basic unit) is such that the first basic unit is larger in scale than the second basic unit. Also, the magnitude relationship in scale between the battery pack 252 (or second basic unit) and the battery module 314 (or third basic unit) is such that the second basic unit is larger in scale than the third basic unit.

In short, the magnitude relationship in scale between the first basic unit and the second basic unit and the magnitude relationship in scale between the second basic unit and the third basic unit are mutually fractal. Thus, in the battery system 203 according to the first embodiment, it is verified that the magnitude relationship in scale between any adjacent layers is homothetic (or fractal), so that a variation of layered basic units is adequately constructed.

The significance of adequately constructing a variation of layered basic units is that even if any scale of system constructions is demanded, any flexible response to the demand for the battery system may be provided. Here, the meaning of the adequately constructing a variation of layered basic units will be briefly explained in an easily understandable manner with an analogy of a commodity transaction of products using Japanese yen. In Japanese yen, if 10,000 yen (a first basic unit), 1,000 yen (a second basic unit), 100 yen (a third basic unit), 10 yen (a fourth basic unit), and 1 yen (a fifth basic unit) are arranged in order of magnitude from a large scale, a variation of layered basic units is constructed.

On a condition that such a variation of layered basic units exist, it is assumed that a product having an economic value of 11,800 yen is purchased. Herein, an action for "paying in just proportion is made to purchase a product having an economic value of 11,800 yen" analogously corresponds to an action for "satisfying the demand for any scale of the system construction."

In the above mentioned case there are many combinations of basic units for paying for a product having an economic value of 11,800 yen in just proportion. For example, a payment for the product may be made with the amount of a combination of one unit of "10,000 yen (or the first basic unit)," one unit of "1,000 yen (or the second basic unit)," and eight units of "100 yen (or the third basic unit)" in just proportion. Also, a payment for the product may be made with the amount of a combination of one unit of "10,000 yen (or the first basic unit)" and eighteen units of "100 yen (or the third basic unit)," or with the amount of a combination of one eleven units of "1,000 yen (or the second basic unit)," and eight units of "100 yen (or the third basic unit)" in just proportion.

Returning to the first embodiment, the fact that there are many combinations of basic units for paying for a product in just proportion means that demands for any scale of a system construction may flexibly be satisfied. Thus, it is verified that even if any scale of the system construction is demanded, the demand may flexibly be satisfied by constructing an adequate variation of layered basic units.

A procedure for constructing the battery system 203 is below discussed. First, variations of layered basic units that are adequately constructed are previously prepared. After a step in determining a design specification in scale of the battery system 203, some candidates of combinations of the basic units adapting to the design specification are selected from the variations. Then, one of the combinations of the basic units is selectively determined from the selected candidates of the combinations of the basic units.

More specifically, for example, when a relatively large scale of the construction demand of a battery system 203 is caused, the battery system 203 is to be constructed by connecting a plurality of the battery blocks 212, as in FIG. 2, in parallel or alternatively both in series and in parallel. Also, when a relatively small scale of the construction demand of a battery system 203 is caused, the battery system 203 is to be constructed by connecting a plurality of the battery modules 314, as in FIG. 2, in parallel or alternatively both in series and in parallel. Thus, according to the battery system 203 of the first embodiment, even if any scale of the system construction demand is caused, the demand may flexibly be satisfied.

[Structure of Battery Module 314]

The explanations on the structure of the battery system 203 are continued. In the first embodiment, the battery module 314 is the smallest basic unit in scale of the variations of layered basic units with respect to the battery system 203. In the embodiment in FIG. 2, three groups of the battery blocks 212 are depicted.

Basic structures of the plurality of battery modules 314 are the same. Thus, a representative structure of one battery module 314 is explained instead of the explanations of all of them. In the same manner, a plurality of battery packs 352 and a plurality of battery blocks 212 are explained.

As in FIG. 3, a battery module 314 is connected to a battery module 314 of another battery pack 252 in series through a positive electrode power connector 352 and a negative electrode power connector 353. As in FIG. 4, each battery module 314 includes four battery groups 312. As in FIG. 4, each of the four battery groups 312 includes a dozen (twelve) battery cells 310.

Each of the four battery groups 312 that belong to one battery module 314 includes a pair of cell control units (CCU) 332 serving as a cell control circuits, as in FIG. 4. Thus, a pair of cell control units (CCU) 332 controls one of the battery groups 312. In the first embodiment, twelve battery cells 310 are divided into two groups of six cells at a high potential side and at a low potential side. Respective terminals of two groups of the high potential side and the low potential side of the battery cells 310 are connected to respective input terminals of the pair of cell control units (CCU) 332.

One of the cell control units (CCU) 332 controls six battery cells 310. However, the number of battery cells 310 that one cell control unit (CCU) 332 controls may arbitrarily be determined, such that the number of cell control units (CCU) 332 is determined as three or each cell control unit (CCU) 332 controls four battery cells 310.

The cell control units (CCU) 332 at high and low potential sides detect voltages between the terminals of respective battery cells 310 connected to input terminals of respective cell control units (CCU) 332, and then calculate a state of charge (which may be abbreviated as "SOC") per each battery cell 310, based on the detected voltage between the terminals of each battery cell 310. Furthermore, based on the voltage between the terminals of each battery cell 310, a diagnosis on whether respective battery cells 310 are over charged or over discharged is performed.

Also, the cell control units (CCU) 332 calculate differences either in voltage or in a state of charge (SOC) between the terminals of a plurality of battery cells 310. Based on the calculated differences the cell control units (CCU) 332 performs a balancing operation discussed below to reduce the differences in voltage or in the state of charge (SOC) among the terminals of a plurality of battery cells 310.

[Balancing Operation of State of Charge (SOC) of Battery Cell 310]

The battery module 314 is constructed by mutually connecting a plurality of battery cells 310 in series. When the battery module 314 is charged or discharged, charging or discharging currents flow through the plurality of battery cells 310 constituting the battery module 314 in the same quantity. Thus, the battery control unit (BCU) 264 controls the charging or discharging operation, as monitoring the voltage between the terminals of the positive electrode 352 and the negative electrode 353.

Herein, a drawback is that the plurality of the battery cells 310 have differences in voltage between the terminals of respective battery cells owing to the respective storage capacities or the state of charge (SOC) thereof. Under this circumstance, when the voltages between the terminals of the battery modules 314 are monitored to control the charge or the discharge operations, only the average voltage (or the voltages between the terminals divided by the number of battery cells 310) of the plurality of battery cells 310 is controlled. Thus, if the voltage between the terminals of the battery module 314 is discharged to the lower limit voltage, a battery cell 310 having a voltage between the terminals thereof lower than the average voltage is over discharged. In contrast, if the voltage between the terminals of the battery module 314 is charged to the upper limit voltage, a battery cell 310 having a voltage between the terminals thereof upper than the average voltage is over charged.

In other words, if, at the time of discharges of the battery cells, a batty cell 310 having the lowest voltage between the terminals thereof is detected, and then the discharges are stopped when the voltage between the terminals of the battery cell 310 is dropped to the low limit voltage, the capabilities of discharging of other battery cells 310 whose voltages are not yet dropped to the low limit voltage still remain. Reversely, if, at the time of charges, a battery cell 310 having the highest voltage between the terminals thereof is detected, and then the charges are stopped when the battery cell 310 is fully charged, other battery cells 310 are not fully charged. Accordingly, the amount of charges of all of the battery modules 314 is reduced.

For the purpose of preventing the reduced amount of charges before it occurs, the cell control unit (CCU) 332 calculates variations or differences in the state of charge (SOC) among a plurality of battery cells 310, and sets up a target parameter based on the results of the calculation. Herein, the target parameter is a characteristic value that is used to reduce the differences in the state of charge (SOC) among the plurality of battery cells 310. The target parameter may be, for example, an average value of the differences in the state of charge (SOC) among the battery cells 310, or a minimum or maximum value of the differences in the state of charge (SOC) among them.

The cell control unit (CCU) 332 refers to a target parameter determined based on a result of the calculation regarding the differences in the state of charge (SOC), and executes a balancing operation, as discussed below, thereby to reduce the differences in the state of charge (SOC) among the battery cells 310. Instead of or in addition to the differences in the state of charge (SOC) among the plurality of battery cells 310, the differences in voltage between the terminals of respective battery cells 310 may be used. This selection of the differences may be applied to the battery control unit (BCU) 264, the integrated battery control unit (IBCU) 226, and the battery system control unit (BSCU) 270, which are positioned as control units that are in the upper level than the cell control unit (CCU) 332.

More specifically, for example, the cell control unit (CCU) 332 connects a terminal of a battery cell 310 whose state of charge (SOC) is high to a discharging circuit (not shown), so as to perform a tracing operation (or a tracking operation) to make the state of charge (SOC) of the battery cell 310 trace a target parameter. This discharge allows the high state of charge (SOC) of the battery cell 310 to fall within the range of the states of charge (SOC) related to the target parameter.

On the other hand, for example, the cell control unit (CCU) 332 connects a terminal of a battery cell 310 whose state of charge (SOC) is low to a charging circuit (not shown), so as to perform a tracing operation (or a tracking operation) to make the state of charge (SOC) of the battery cell 310 trace a target parameter. This charge allows the low state of charge (SOC) of the battery cell 310 to fall within the range of the states of charge (SOC) related to the target parameter.

[Construction of Battery Pack 252]

In the first embodiment, the battery pack 252 is a basic unit belonging to an upper level in a variation of layered basic units related to the battery system 203 than the level of the battery module 314. The embodiment in FIG. 2 describes three groups of the battery packs 252.

As in FIG. 2 to FIG. 4, each of the battery packs 252 includes a battery control unit (BCU) 264. Although FIG. 2 exemplifies a plurality of battery modules 314 connected under the control of the battery control unit (BCU) 264, for concisely showing the structure in FIG. 4, it shows an embodiment in which only one battery module 314 is connected. Explanations about the first embodiment of this invention are pursued with a plurality of battery modules 314 depending on the battery control unit (BCU) 264 under control thereof. The battery control unit (BCU) 264 receives SOC data related to the state of charge (SOC) of the battery cells 310 from the cell control units (CCU) 332 belonging to the battery module 314 under the control of the battery control unit (BCU) 264. Based on the SOC data the battery control unit (BCU) 264 calculates variations or differences in the state of charge (SOC) among the battery modules 314 under the control of the battery control unit (BCU) 264. Based on the calculated results the battery control unit (BCU) 264 sets up a target parameter and provides instructions to the cell control units (CCU) 332 belonging to the battery modules 314 under the control of the battery control unit (BCU) 264 to make the cell control units (CCU) 332 perform balancing operations of the state of charge (SOC) with reference to the target parameter. So far, an example is described in which the cell control units (CCU) 332 calculate the states of charge (SOC) and send the SOC data to the battery control unit (BCU) 264. However, the calculating function of the state of charge (SOC) may be provided to the battery control unit (BCU) 264 such that the cell control unit (CCU) 332 detects only the voltages among the battery cells 310 and provides them to the battery control unit (BCU) 264.

The battery control unit (BCU) 264 reports the SOC data and the instructions etc., to the integrated battery control unit (IBCU) 226 and the battery system control unit (BSCU) 270, which are control units in upper level than the battery control unit (BCU) 264.

[Configuration of Battery Block 212]

In the first embodiment, the battery block 212 is a basic unit belonging to the highest level in a variation of layered basic units related to the battery system 203. The embodiment in FIG. 2 describes three groups of the battery blocks 212.

As in FIG. 3, each of the battery blocks 212 includes two groups of the battery units 222A, 222B, which are connected in parallel one another. Each of the two groups of battery units 222A, 222B includes a plurality of battery packs 252. In the first embodiment each of the battery units 222A, 222B includes three battery packs 252. In response to the magnitude of the direct currents stored, two groups of the battery units 222A, 222B may be connected in series.

In the first embodiment of this invention two groups of the battery units 222A, 222B are connected in parallel one another. In particular, the voltage in the battery block 212 is decreased to a low voltage that is relatively safe, such as not more than 1000 V, preferably not more than 650 V. This leads to safe assurance at the time of maintenance and a low cost due to inhibition of a grade of breakdown voltage.

The number of the groups of the battery units 222A, 222B, which each battery block 212 has, is not limited to two. Taking into consideration of proposes of use and use conditions of the storage system 200, proper numbers of the units may be determined. According to the first embodiment in which two groups of the battery units 222A, 222B are connected in parallel one another, assuring safety and convenience at the time of maintenance is expected.

As in FIG. 2 and FIG. 3, each battery block 212 includes the integrated battery control unit (IBCU) 226. The integrated battery control unit (IBCU) 226 receives SOC data related to the state of charge (SOC) of the battery cells 310 from the cell control units (CCU) 332 belonging to the battery modules 314 further belonging to the battery packs 252 under the control of the integrated battery control unit (IBCU) 226. Based on the SOC data, the integrated battery control unit (IBCU) 226 calculates variations or differences in the state of charge (SOC) between the battery packs 252 under its control. Based on the calculated results the integrated battery control unit (IBCU) 226 sets up a target parameter and provides instructions to the cell control units (CCU) 332 belonging to the battery modules 314 further belonging to the battery packs 252 under control of the integrated battery control unit (IBCU) 226 to make the cell control units (CCU) 332 perform balancing operations of the states of charge (SOC) referring to the target parameter.

Also, the integrated battery control unit (IBCU) 226 reports the SOC data and the instructions etc., to the battery system control unit (BSCU) 270, which is a control unit that is upper in level than the integrated battery control unit (IBCU) 226.

[Configuration of Integrated Unit 224]

Each battery block 212 includes an integrated unit 224. Each integrated unit 224 includes the integrated battery control unit (IBCU) 226, switches 232, 233, 234, 235, current sensors 227, 228, and voltage sensors 229, 230, 231. The integrated battery control unit (IBCU) 226 controls the units in the battery block 212. The switches 232, 233, 234, 235 operate to electrically open or close the circuits of the battery units 222A, 222B. The current sensors 227, 228 detect magnitude of currents flowing through the battery units 222A, 222B, respectively.

The voltage sensor 229 detects a voltage at a positive electrode side (or a voltage at a positive electrode side terminal 244). The voltage sensors 230, 231 detect voltages at positive electrode sides of power supply circuits of the battery units 222A, 222B, respectively. In detail each of the voltage sensors 230, 231 detect a voltage between the terminals of each of the battery units 222A, 222B, respectively.

The integrated battery control unit (IBCU) 226 receives values of charging and discharging currents detected by the current sensors 227, 228, values of voltages at predetermined points detected by the voltage sensors 229, 230, 231, and information from the battery packs 252 under the control of the integrated battery control unit (IBCU) 226, or information and instructions from the battery system control unit (BSCU) 270. Based on the various detected values, information and instructions, the integrated battery control unit (IBCU) 226 controls the switches 232, 233, 234, 235 to close or open them.

Also, the integrated battery control unit (IBCU) 226 reports calculated results related to the differences in the state of charge (SOC) among the battery packs 252, values of charging and discharging currents detected by the current sensors 227, 228, and values of voltages at predetermined points detected by the voltage sensors 229, 230, 231 to the battery system control unit (BSCU) 270, which is upper in level than the integrated battery control unit (IBCU) 226.

[Operations of Switches 232, 234, 240, 242 and Breakers 238, 239]

Maintenances and inspections are conducted for respective battery units 222A, 222B. Thus, the battery units 222A, 222B are stopped during maintenances and inspections. In this case the states of charge (SOC) of the battery cells 310 that are stopped become different from those of the battery cells that continue to operate. As a result, when the battery units 222 that have different SOCs each other are connected in parallel, high currents possibly flow from the battery unit 222 that has a large SOC to the battery unit 222 that has a small SOC.

For this reason, current limiters 236, 237 are disposed for the battery units 222A, 222B, respectively. When the battery unit 222A is connected between a positive electrode side line 246 and a negative electrode side line 247, the switch 232 is first closed. Then, the battery unit 222A is connected between the positive electrode side line 246 and the negative electrode side line 247 through the current limiter 236. At this time a value of a current flowing through the current limiter 236 is detected by the current sensor 228.

When the value detected by the current sensor 228 (or a value of charging or discharging current of the battery unit 222A) is not more than a preset value, the switch 232 is opened after the switch 234 is closed. This configuration allows the charging and discharging currents of the battery cells 310 to fall within the range of the safe values.

In the first embodiment of this invention lithium-ion (secondary) batteries are employed for the battery cells 310. Voltages between the terminals of the lithium-ion batteries vary based on the SOCs. Thus, a current value at the time of turning on the switch 234 may be predicted by the detected value of the voltage sensor 230. At the time of turning on the battery unit 222A, from the point of view of improving safety, the switch 232 may first be turned on to limit the current flowing through the current limiter 236 to the safe value, so that a turn-on operation of the switch 234 is controlled based on the value detected by the voltage sensor 230.

If the value detected by the voltage sensor 230 is within a preset range in relation to the voltage between the terminals of the other battery unit 222B, the switch 234 may be turned on without turning on the switch 232. Operation procedures of the switches 233, 235 related to the battery unit 222B are the same those stated above regarding the battery unit 222A.

As in FIG. 3, the positive electrode side terminals 244 of the positive and negative electrode terminals that three groups of the battery blocks 212 have are connected in parallel with the positive electrode side line 246 through a plurality of breakers 238. The positive electrode side line 246 is connected to a positive electrode output terminal 248 through one switch 242. The switch 242 is controlled to be opened or closed based on control signals of the battery system control unit (BSCU) 270.

Similarly, as in FIG. 3, the negative electrode side terminals 245 that the three groups of the battery blocks 212 have are connected in parallel to the negative electrode side line 247 through a plurality of breakers 239. The negative electrode side line 247 is connected to a negative electrode output terminal 249 through one switch 240.

The breakers 238, 239 and the switches 240, 242 operate as a "closing or opening device." The breakers 238, 239 and the switches 240, 242 may be collectively called as a "closing or opening device." When the closing or opening devices 238, 239, 240, 242 are closed, the battery blocks 212 are connected in parallel one another, as in FIG. 3, with the positive electrode output terminal 248 and the negative electrode output terminal 249. Similarly, a plurality of battery systems 203 in FIG. 1 is connected in parallel to the positive electrode output terminal 248 and the negative electrode output terminal 249.

When the battery system 203 in FIG. 3 is electrically separated from other battery systems 203 in FIG. 1, the following procedures are executed for the battery system 203 that is to be separated: First, based on instructions from the battery system control unit (BSCU) 270, the switch 242 is opened to interrupt the charging and discharging currents. Then, the closing or opening devices 238, 239, 240 are opened in sequence.

To the contrary, when the battery system 203 in FIG. 3 is connected to other battery systems 203 in FIG. 1 in parallel one another, the following procedures are executed for the battery system 203 that is to be connected: First, the closing or opening devices 238, 239, 240 are closed in sequence. Then, based on instructions from the battery system control unit (BSCU) 270 the switch 242 is closed.

[Transmission of Information and Control in Battery System 203]

In the Battery System 203 information and instructions from the integrated battery control unit (IBCU) 226 are transmitted to the battery system control unit (BSCU) 270 through an information bus 272. Furthermore, various information and instructions are transmitted from a control device (not shown) in the storage system 200 in FIG. 1 to the battery system control unit (BSCU) 270 through an information input-output port 274.

The battery system control unit (BSCU) 270 controls closing or opening operation of the switch 242. The battery system control unit (BSCU) 270 controls the switch 242 to be opened, when the condition for electrically disconnecting a battery system 203 from the storage system 200 is established based on information or requirements from the integrated battery control unit (IBCU) 226 or based on information or requirements from the control apparatus of the upper storage system 200.

When the switch 242 is opened, the battery system 203 is electrically separated from the related system of the storage system 200. This results in an interruption of a current flowing through the battery system 203. Then, the switch 240 is opened, while the breakers 238, 239 for respective battery blocks 212 are opened. When the power supply circuit of the battery system 203 is opened based on these procedures, maintenances and inspections may easily be performed every unit of battery system 203, while safety of maintenances and inspections may be ensured.

[Power Supply for Control]

In each battery system 203 of the first embodiment, as in FIG. 3, the battery system control unit (BSCU) 270, the integrated battery control unit (IBCU) 226, and the battery control unit (BCU) 264 realize various functions of them with software installed in a microcomputer. Thus, electric power for control is needed to be supplied to a microcomputer to operate it.

A microcomputer operates at a relatively low direct-current voltage of about five voltages, for example. For this reason, in the first embodiment alternating-current power providing easy conversion of a voltage is used instead of use of a stored voltage. The power stored in each of the battery blocks 212 or the battery system 203 may be used for power that is to be supplied to a microcomputer that realizes the functions of the battery system control unit (BSCU) 270 and the integrated battery control unit (IBCU) 226.

When outside alternating-current power is used, its voltage may easily be changed with a transformer. In this case the voltage conversion is easy and efficient in comparison with a voltage conversion of stored direct-current power with a DC/DC converter. However, for power to be supplied to a microcomputer outside direct-current power or direct-current power stored inside may be used.

In the battery system 203 of the first embodiment, as in FIG. 3, alternating-current power is supplied from outside through a control power input port 282 to the battery system. Alternating-current power from the control power input port 282 is supplied to an uninterruptible-power system (UPS) 284. Usually, direct-current power for control is made from alternating-current power supplied through the control power input port 282. However, when alternating-current power stops from outside, the uninterruptible-power system (UPS) 284 alternatively supplies demanded power, instead, to the battery system. The uninterruptible-power system (UPS) 284 may be composed of a secondary battery storing direct-current power that is slightly higher in voltage than a control power, for example.

The power supplied from the uninterruptible-power system (UPS) 284 is supplied to a power supply unit (PSU) 286. At the power supply unit (PSU) 286 a direct-current voltage that is low is generated. The direct-current voltage generated in this manner is supplied to the battery system control unit (BSCU) 270, the integrated battery control units (IBCU) 226, and battery control units (BCU) 264.

The battery system 203 of the first embodiment includes the uninterruptible-power system (UPS) 284. Thus, even if an anomaly occurs to interrupt an alternating-current from the control power input port 282, the operation of the battery power system 203 may be sustained. When such a malfunction occurs, the alternating-current power is changed to the power supplied from the uninterruptible-power system (UPS) 284.

[Transmission Path in Battery Pack 252]

As in FIG. 4, two groups of isolated circuits (serial transmission paths) 346A, 346B in the battery pack 252 are connected to the battery control unit (BCU) 264 through first transmission lines 342A, 342B. Each second transmission line 344 connects adjacent cell control units (CCU) 332. As in FIG. 3, the battery control units (BCU) 264 receive the direct-current power from the control power supply line 288 to operate.

Each of the cell control units (CCU) 332 receives direct-current power from the battery cells 310 under its control to operate. Thus, a reference potential of a power supply voltage that is to be supplied to the battery control unit (BCU) 264 is different from that is to be supplied to each of the cell control units (CCU) 332. That is, the potentials of the first transmission lines 342A, 342B are different from those of the second transmission lines 344. Thus, the first transmission lines 342A, 342B and the second transmission lines 344 are connected through the isolated circuits 346A, 346B.

More specifically, the isolated circuits 346A, 346B are photo couplers or transformers. The isolated circuits 346A, 346B serves to once modulate electrical signals to optical signals or flux signals of another transmission medium, and then demodulate them to electrical signals again. This results in a certain electrical isolation between the first transmission lines 342A, 342B and the second transmission lines 344.

In the first embodiment a transmission is performed from the cell control unit (CCU) 332 having a higher potential to a unit having a lower potential in sequence. To the contrary a transmission may be performed from a unit having a lower potential to a unit having a higher potential. When the output terminal of the cell control unit (CCU) 332 is connected to the input terminal of an adjacent cell control unit (CCU) 332, they may be connected through an electric resistance or a diode or a capacitor.

Data signals that are to be transmitted from the battery control unit (BCU) 264 to respective cell control units (CCU) 332 are transmitted from the battery control unit (BCU) 264 to the isolated circuit 346A through the first transmission line 342A, and then from the isolated circuit 346A to respective cell control units (CCU) 332 through the second transmission lines 344. Further, the data signals passing through the second transmission lines 344 are transmitted to the isolated circuit 346B. Then, the data signal returns to the battery control unit (BCU) 264 through the first transmission line 342B.

Each cell control unit (CCU) 332 identifies whether the address data in the data signal received is own, and responds to the data signal when the address data is own. Furthermore, the cell control unit (CCU) 332 adds information required by instructions to the data signal, if necessary, and then transmits it to a next cell control unit (CCU) 332 in the order of transmissions.

Each cell control unit (CCU) 332 adds various detection results or diagnoses to the data signal, in response to the requirements of the battery control unit (BCU) 264, and transmits it to the battery control unit (BCU) 264. Each cell control unit (CCU) 332 may give various diagnoses in addition to a diagnosis about an over charge or an over discharge, and may add these diagnoses to the data signal in transmission.

The battery control unit (BCU) 264 is connected to the integrated battery control unit (IBCU) 226, which is a higher control unit, through the information bus 272 and a connector 356 for the information bus. The received data on various detection results and diagnoses is transmitted to the integrated battery control unit (IBCU) 226.

Also, the received data on various detection results and diagnoses that the battery control unit (BCU) 264 receives is stored in a nonvolatile memory 266. Especially, when receiving a signal on anomaly diagnoses, the battery control unit (BCU) 264 stores the detection results that for the bases of the anomaly diagnoses as well as identification data on a battery cell 310 related to the anomaly diagnoses. The information reported from the battery control unit (BCU) 264 to the integrated battery control unit (IBCU) 226 is further reported to the battery system control unit (BSCU) 270 through the information bus 272.

[Battery Block Storage Apparatus 412 of Battery Block 212]

FIG. 5 is an outside view of the battery block storage apparatus 412 storing the battery blocks 212. In the top section of the battery block storage apparatus 412, as in FIG. 5, an integrated unit storage section 422 is provided to store the integrated unit 224. In six sections positioned under the integrated unit storage section 422 respective pack storage housings 432 are provided to store the battery packs 252. Respective pack storage housings 432 are formed to be conveniently drawn from or pressed into the frame of the battery block storage apparatus 412.

[Configuration, Functions and Effects of Battery System of the First Embodiment]

The battery system 203 in accordance with the first embodiment premises a battery system that is constructed by mutually layering battery modules 314 in each of which a plurality of battery cells 310 are connected in series, battery packs 252 in each of which the battery modules 314 are connected either in series or in parallel or both in series and in parallel, and battery blocks 212 in each of which the battery packs 252 are connected either in series or in parallel or both in series and in parallel.

The battery system 203 in accordance with the first embodiment includes the cell control units (CCU) 332, the battery control units (BCU) 264, and the integrated battery control units (IBCU) 226. Each cell control unit (CCU) 332 operates to calculate differences in the state of charge and/or in electric energy among the battery cells 310, and to balance the differences among the battery cells 310 based on the calculated results related to the differences.

Each battery control unit (BCU) 264 executes control operations to calculate differences in the state of charge and/or in electric energy among the battery modules 314, and to reduce the differences among the battery modules 314 based on the calculated results related to the differences.

Each integrated battery control unit (IBCU) 226 executes control operations to calculate differences in state of charge and/or electric energy among the battery packs 252, and to reduce the differences among the battery packs 252 based on the calculated results related to the differences.

In the battery system 203 in accordance with the first embodiment, the battery modules 314, the battery packs 252, and the battery blocks 212, which are positioned as a variation of layered basic units, are previously prepared. In response to a scale needed, the basic units are accordingly combined. According to the battery system 203 of the first embodiment, even if any system configurations in scale are required, a battery system 203 of flexibly responding to the requirements may be provided. Also, a battery system 203 that is considered to assure safety may be provided.

The battery system 203 in accordance with the first embodiment may employ a configuration in which the integrated battery control unit (IBCU) 226 considers a target parameter set up based on the calculated results related to the differences among the battery packs 252 and executes a controlling operation to reduce the differences, the battery control unit (BCU) 264 considers a target parameter set up based on the calculated results related to the differences among the battery modules 314 and executes a controlling operation to reduce the differences, and the cell control unit (CCU) 332 considers a target parameter set up based on the calculated results related to the differences among the battery cells 310 and executes a controlling operation to reduce the differences.

According to the configurations stated above, the integrated battery control unit (IBCU) 226, the battery control unit (BCU) 264, and the cell control unit (CCU) 332 consider the target parameter to execute control operations for balancing respective differences, so that effects taken by the controls or operations for balancing the differences are enhanced.

Also, the battery system 203 in accordance with the first embodiment may employ another configuration in which a battery system control unit (BSCU) 270 is further included to execute control operations to calculate differences in the state of charge and/or in electric energy among the battery blocks 212, and to reduce the differences among the battery blocks 212 based on the calculated results related to the differences.

Also, the battery system 203 in accordance with the first embodiment may employ another configuration in which the battery blocks 212 are connected either in series or in parallel or both in series and in parallel.

Also, the battery system 203 in accordance with the first embodiment may employ another configuration in which each battery block 212 is provided on a relaying path connecting the positive electrode side terminal 244 on the main power supply line of the battery system 203 to a positive electrode side of a power supply line of the battery pack 252, the closing or opening devices 232, 233, 234, 235 are provided to open or close the relaying path, and the battery system control unit (BSCU) 270 controls the closing or opening operations of the closing or opening devices 238, 239, 242, based on the calculated results related to the differences among the battery blocks 212.

According to the configurations stated above, a selection on what battery block 212 or battery blocks 212 of a plurality of battery blocks 212 the electric power should be supplied to is autonomously controlled based on the calculated results related to the differences among the battery blocks 212.

Also, the battery system 203 in accordance with the first embodiment may be equipped with a breaker 240 that is manually operated to electrically disconnect the battery blocks 212 from the main power supply line of the battery system 203.

According to the configuration stated above, even if over currents flow through the closing or opening devices 238, 239, 242, resulting in adhesion of their contacts, safety may be improved by electrically disconnecting the battery blocks 212 from the main power supply line of the battery system 203.

[Battery System 205 in Accordance with Second Embodiment]

A battery system 205 in accordance with a second embodiment of this invention is below explained in reference to the accompanied drawings. FIG. 6A and FIG. 6B are views for explaining disadvantages of a comparative example to the battery system 203 in accordance with the first embodiment of this invention. It is supposed that the inverter 114, which is connected to the power system 104 (see FIG. 1), is electrically connected to the battery system of the comparative example at any time, e.g., time t1. In this case it is also supposed that there is a given difference in potential, as in FIG. 6A, between the inverter 114, which is connected to the power system 104, and the battery system of the comparative example. Also, in the figure the voltage across the inverter 114 is shown as the electric power system.

If, at time t1, the inverter 114 is electrically connected to the battery system of the comparative example, a rush current flows through them because of the presence of a given difference in potential. In an embodiment in FIG. 6B the battery system of the comparative example is lower in potential than the power system. As a result, a charging current flows in the battery system of the comparative example.

In that case there is a requirement for avoiding the rush current being generated at time t1, before it occurs. The reason is that damage to the system such as a breakage of a relay due to a flow of the rush current is prevented, before the damage is caused. Thus, the battery system 205 in accordance with the second embodiment was conceived.

[Outline of Battery System 205 in Accordance with Second Embodiment]

Figure 7:
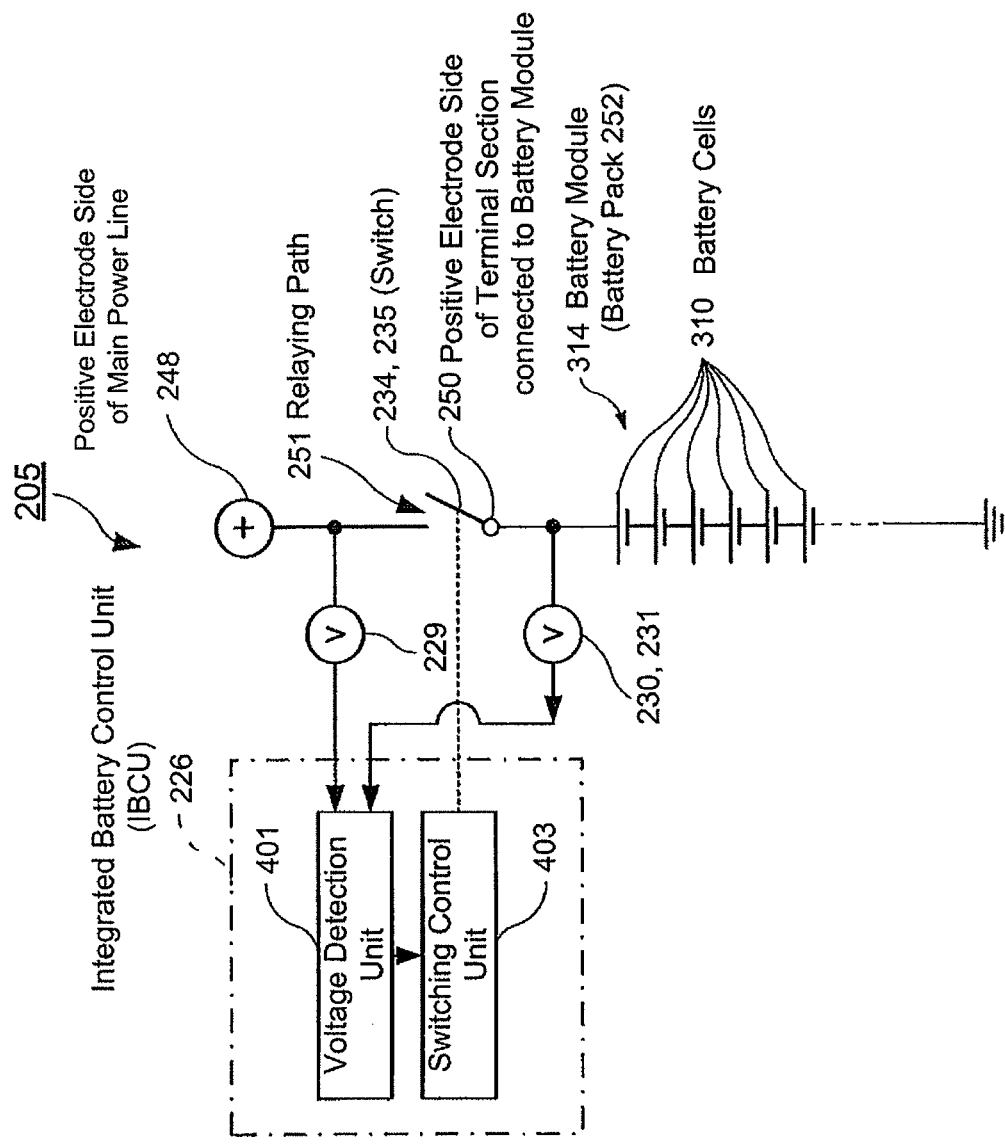
FIG. 7 is a diagram showing a concept of a main part of the battery system 205 in accordance with the second embodiment of this invention.

FIG. 7 is a diagram showing a concept of a main part of the battery system 205 in accordance with the second embodiment of this invention. The basic construction of the battery system 205 of the second embodiment is substantially the same as that of the battery system 203 of the first embodiment. Thus, same reference numbers are used for elements having functions common to both embodiments, and details about the common elements are omitted. Explanations on the second embodiment are continued to focus the differences between the two embodiments.

The differences between the first embodiment and the second embodiment are as follows: In the battery system 203 of the first embodiment the integrated battery control unit (IBCU) 226 is provided with the current limiters 236, 237 to prevent the rush current from being generated at the moment when the battery system 203 of the first embodiment is connected to the inverter 114, which is electrically connected to the power system 104, under the condition that there is a difference in potential between the inverter 114 and the battery system 203.

In contrast, in the battery system 205 of the second embodiment the integrated battery control unit (IBCU) 226 is provided with a voltage detection unit 401 and a switching control unit 403, as in FIG. 7, to prevent the rush current from being generated at the moment when the battery system 205 of the second embodiment is connected to the inverter 114 under the condition that there is a difference in potential between the inverter 114 and the battery system 205. In short, the battery system 205 of the second embodiment is widely different from the battery system 203 of the first embodiment in that the battery system 205 has additional technical members to prevent the rush current from being generated, before the rush current occurs.

In detail, the battery system 205 of the second embodiment premises a battery system 205 in which a battery module 314 in which a plurality of battery cells 310 are connected in series is connected to the main power line. The battery system 205 of the second embodiment is provided on a relaying path 251 connecting a positive electrode side terminal 248 on the main power supply line to a positive electrode side terminal 250 of terminals connected to the battery module 314, as in FIG. 7, and includes the closing or opening devices 234, 235 to open or close the relaying path 251.

Also, as in FIG. 7, the battery system 205 of the second embodiment includes the voltage detection unit 401 that detects each of the voltage at the positive electrode side terminals 248 of the main power supply line and the voltage at the positive electrode side terminals 250 of the terminal section, and the switching control unit 403 that compares the voltage detected by the voltage detection unit 401 at the positive electrode side terminal 248 of the main power supply line with the voltage at the positive electrode side terminal 250 of the terminals to determine which is large or small, determines whether the difference in voltage between them is not more than a preset value, and controls the closing or opening operations of the closing or opening devices 234, 235, based on the determination.

[Operations of Battery System 205 in Accordance with Second Embodiment]

Figure 8:
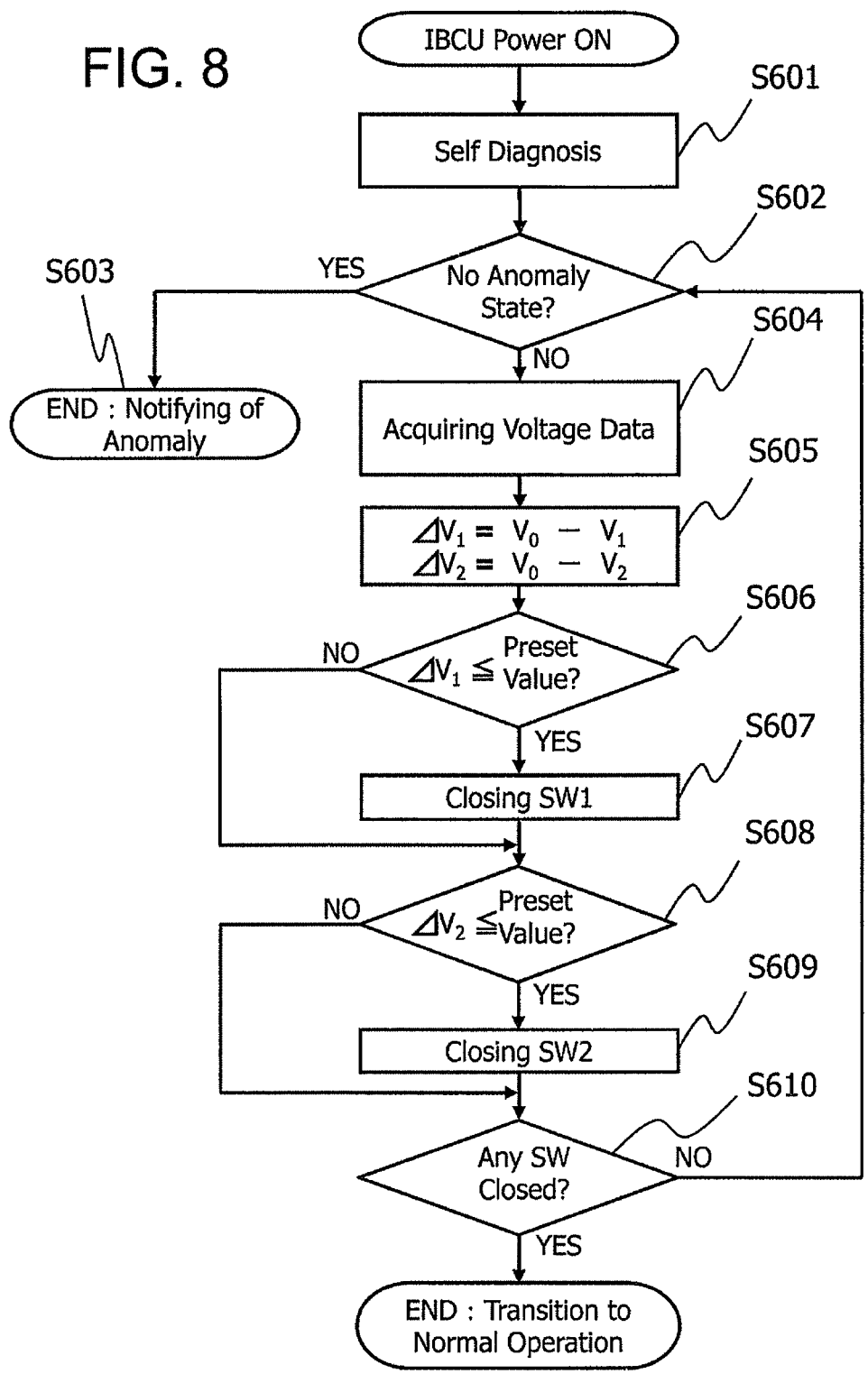
FIG. 8 is a flowchart for explaining an operation of the battery system 205 in accordance with the second embodiment of this invention.
Figure 9:
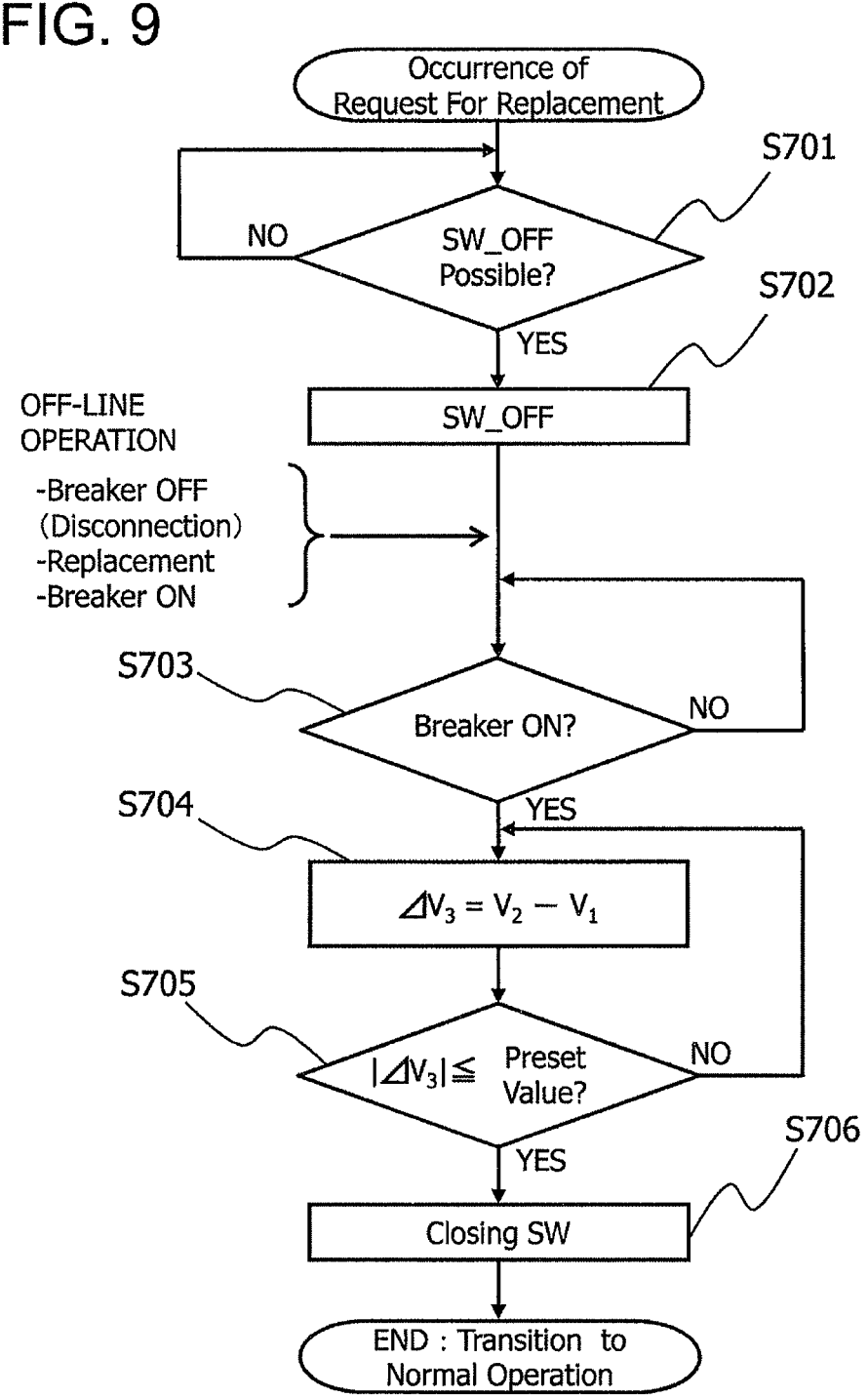
FIG. 9 is a flowchart for explaining an operation of the battery system 205 in accordance with the second embodiment of this invention.

Operations of the battery system 205 in accordance with the second embodiment are now explained in reference to the accompanied drawings. FIG. 8 and FIG. 9 are flowcharts for explaining operations of the battery system 205 in accordance with the second embodiment of this invention. FIG. 10A, FIG. 10B, FIG. 10C, FIG. 10D, and FIG. 11 are time charts for explaining operations of the battery system 205 in accordance with the second embodiment of this invention. The flowchart in FIG. 8 shows an example of an operation executed when the battery system 205 in accordance with the second embodiment of this invention is connected to the main power supply line at the first time.

When the integrated battery control unit (IBCU) 226 is turned ON, the microcomputer in the integrated battery control unit (IBCU) 226 is activated to run the program.

In step S601 the integrated battery control unit (IBCU) 226 executes a self-diagnosis in the battery system 205. The self-diagnosis is made for all the battery cells 310 that are positioned under the control of a battery module 314 belonging to a battery pack 252, so as to check whether they are over charged or over discharged.

In step S602 the integrated battery control unit (IBCU) 226 determines whether an anomaly state is found based on the self-diagnosis in the battery system 205. As a result of the determination in step S602, if it is determined an anomaly state is found, the integrated battery control unit (IBCU) 226 forwards the processing flow to step S603.

In step S603 the integrated battery control unit (IBCU) 226 notifies the battery system control unit (BSCU) 270, which is higher in level than itself, of its identification code as well as a fact that an anomaly state is caused, and then stops the process from flowing. If it is determined that no anomaly state is found, the integrated battery control unit (IBCU) 226 forwards the processing flow to step S604.

In step S604 the voltage detection unit 401 of the integrated battery control unit (IBCU) 226 obtains information on a voltage between the terminals of each of all the battery cells 310 from all the cell control units (CCU) 332 under the control of the battery modules 314 belonging to the battery packs 252. Also, the integrated battery control unit (IBCU) 226 may detect information on a voltage between each of all the battery modules 314, instead of obtaining information on a voltage between the terminals of each of all the battery cells 310.

In step S605 the integrated battery control unit (IBCU) 226 executes a comparing operation for the information on the obtained voltages between the terminals. In concrete the integrated battery control unit (IBCU) 226 compares a reference voltage V0 at the main power supply line side with respective total voltages V1, V2 of two groups of serially-connected batteries as in FIG. 3, and obtains respective difference voltages ΔV1 and ΔV2.

In step S606 the integrated battery control unit (IBCU) 226 compares ΔV1 with a first preset value for obtaining a magnitude relationship between them. As a result of this comparing process, if ΔV1 is not more than the first preset value, namely, if the differences in voltage among the mutually-connected battery packs 252 (which are provided in parallel) are small, the integrated battery control unit (IBCU) 226 forwards the processing flow to step S607.

In step S607 the switching control unit 403 of the integrated battery control unit (IBCU) 226 controls one closing or opening device 234 to be closed. This allows a relaying path 257 connecting the main power supply line to the battery pack 252 to be closed, so that the power of the main power supply line is supplied to the battery packs 252.

As a result of the comparing process in step S606, if ΔV1 is more than the first preset value, namely, if the differences in voltage between the mutually-connected battery systems 205 are relatively large, the integrated battery control unit (IBCU) 226 forwards the processing flow to step S608.

In step S608 the integrated battery control unit (IBCU) 226 compares ΔV2 with a second preset value for obtaining a magnitude relationship between them. As a result of this comparing process, if ΔV2 is not more than the second preset value, namely, if the differences in voltage between the mutually-connected battery systems 205 are small, the integrated battery control unit (IBCU) 226 forwards the processing flow to step S609.

In step S609 the switching control unit 403 of the integrated battery control unit (IBCU) 226 controls the other closing or opening device 235 to be closed. This allows the relaying path 257 connecting the main power supply line to the battery pack 252 to be closed, so that the power of the main power supply line is supplied to the battery packs 252.

As a result of the comparing process in step S608, if ΔV2 is more than the second preset value, namely, if the differences in voltage between the mutually-connected battery systems 205 are relatively large, the integrated battery control unit (IBCU) 226 forwards the processing flow to step S610.

In step S 610 the switching control unit 403 of the integrated battery control unit (IBCU) 226 determines whether at least one of the closing or opening devices 234, 235 is closed. As a result of the determination in step S610, if it is determined that no closing or opening device 234, 235 is closed, the switching control unit 403 of the integrated battery control unit (IBCU) 226 returns the processing flow to step S602 and repeatedly executes following processes.

On the other hand, as a result of the determination in step S610, if it is determined that at least one of the closing or opening devices 234, 235 is closed, the switching control unit 403 of the integrated battery control unit (IBCU) 226 ends this initial processing flow for a start-up and transmits the processing flow to the normal charging operation.

The flowchart in FIG. 8 shows an example of the initial process for a start-up and explains the closing or opening operation of the switching control unit 403. It is noted that the closing conditions of the switching control unit 403 are the same as those in steps S 602 to S609, even after the processing flow is transmitted to a normal charging operation. Also, in the second embodiment the first and second preset values are determined in view of the currents flowing through the battery packs 252 being within an extent of values that do not affect safety or lifetime of the battery cells 310 belonging to the battery packs 252. More specifically, the first and second preset values of currents are determined to fall within the range of the values not in excess of 10 A of current flowing at the time of closing the closing or opening devices 234, 235 in view of impedance of the battery packs 252 and the lines. The first and second preset values may be the same or different each other. In the second embodiment the first and second preset values and a third preset value as discussed below are set to be the same.

FIG. 9 is a flowchart for explaining an example of an operation in the battery system 205 when the battery packs 252 has a malfunction and replacement or maintenance is performed for them.

When replacement is required during a normal charging or discharging operation, the microcomputer in the integrated battery control unit (IBCU) 226 is activated to run a processing program at the time of a requirement for replacement.

In step S701 the integrated battery control unit (IBCU) 226 determines whether the closing or opening devices 234, 235 should be opened. As a result of the determination in step S701, if it is determined that no closing or opening devices 234, 235 should be opened, the integrated battery control unit (IBCU) 226 repeatedly executes a normal charging or discharging operation and the processing operation in step S701.

As a result of the determination in step S701, if it is determined that the closing or opening devices 234, 235 should be opened, the integrated battery control unit (IBCU) 226 forwards the processing flow to step S702.

In step S702 the switching control unit 403 of the integrated battery control unit (IBCU) 226 controls the closing or opening devices 234, 235 to be opened. This makes the relaying path 257 connecting the main power supply line to the battery packs 252 opened, so that the power supply from the main power supply line to the battery packs 252 stops.

After the closing or opening devices 234, 235 are opened, the breakers 238, 239 for maintenance are used to manually shut down the main power supply. After a failure is manually exchanged, the breakers 238, 239 are manually closed to recover the main power supply line. In step S 703 the integrated battery control unit (IBCU) 226 repeatedly determines whether the breakers 238, 239 are closed until they are closed.

As a result of the determination in step S703, if it is determined that the breakers 238, 239 are closed, the integrated battery control unit (IBCU) 226 forwards the processing flow to step S704.

In step S704 the integrated battery control unit (IBCU) 226 determines which of the total voltages V1, V2 of two groups of serially-connected batteries are large or small to obtain an absolute value of ΔV3 representing the difference between them.

In step S705 the integrated battery control unit (IBCU) 226 compares the absolute value of ΔV3 and the third preset value. As a result of the comparing process, if the absolute value of ΔV3 is more than the third preset value, namely, if the differences in voltage among the mutually-connected battery systems 205 are large, the integrated battery control unit (IBCU) 226 returns the processing flow to step S704 and repeats the processing in steps S704 to S705.

As a result of the comparing process in step S705, if ΔV3 is not more than the third preset value, namely, if the differences in voltage among the mutually-connected battery systems 205 are small, the integrated battery control unit (IBCU) 226 moves the processing flow to step S706. Similar to the first and second preset values the third preset value is determined in view of the currents flowing through the battery packs 252 being within an extent of values that do not affect safety or lifetime of the battery cells 310 belonging to a battery packs 252. In concrete, the third preset value of a voltage is determined to an extent not in excess of 10 A of currents flowing at the time of closing the closing or opening devices 234, 235 in view of impedance of the battery packs 252 and the lines.

In step S706 the integrated battery control unit (IBCU) 226 controls both the closing or opening devices 234, 235 to be closed. This makes the relaying path 257 connecting the main power supply line to the battery pack 252 closed, so that the power supply from the main power supply line is supplied to the battery packs 252. Then, the integrated battery control unit (IBCU) 226 transmits the processing flow to the normal charging or discharging operations.

FIG. 10A to FIG. 10D are examples of time charts when the flowchart in FIG. 8 is executed.

When the integrated battery control unit (IBCU) 226 is turned ON at time T1, as in FIG. 10A, the microcomputer is started up. At time t2 when the self-diagnosis is completed and it is determined that there is no anomaly state, it is determined whether the closing or opening devices 234, 235 should be closed or not. The respective difference voltages ΔV1 and ΔV2 between the reference voltage V0 and respective total voltages V1, V2 of two groups of serially-connected batteries are compared with the first and second preset values. Then, the closing or opening device related to the battery pack 252 in which the difference voltage ΔV1 or ΔV2 is not more than the first or second preset value is closed, and then a discharge begins (at the serially-connected batteries having total voltage V1, in FIG. 10B).

At the time when one of the closing or opening devices 234, 235 that relates to the total voltage V1 is closed, the voltage (V1) of the related battery pack 252 is changed to the same voltage as the reference voltage V0 on the main power supply line, as in FIG. 10C. On the other hand, at time t2, in the battery pack 252 that has ΔV2 that is a difference from the reference voltage V0 and is larger than the second preset value, when the reference voltage V0 lowers with the discharge, the difference ΔV2 is reduced (as in FIG. 10D). At time t3, as in FIG. 10D, the closing or opening device related to that battery pack 252 is closed too.

Figure 11A:
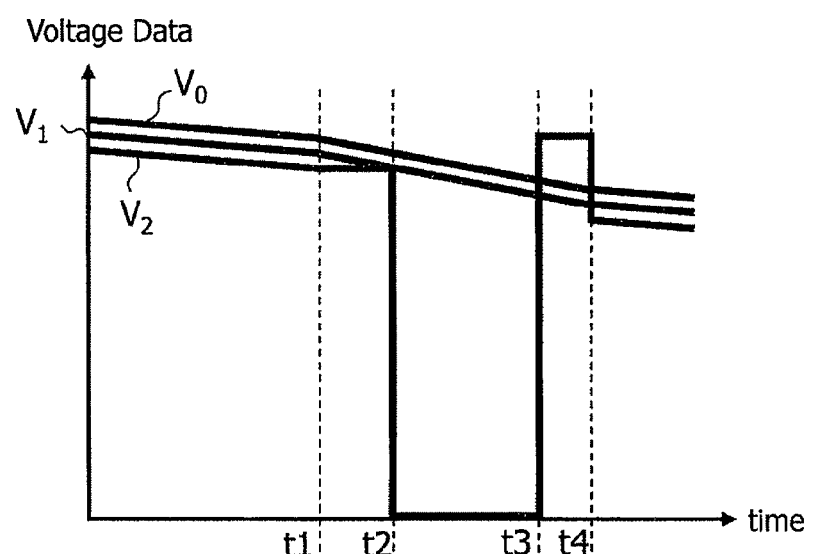
FIG. 11A and FIG. 11B are time charts related to the flowchart in FIG. 9.
Figure 11B:
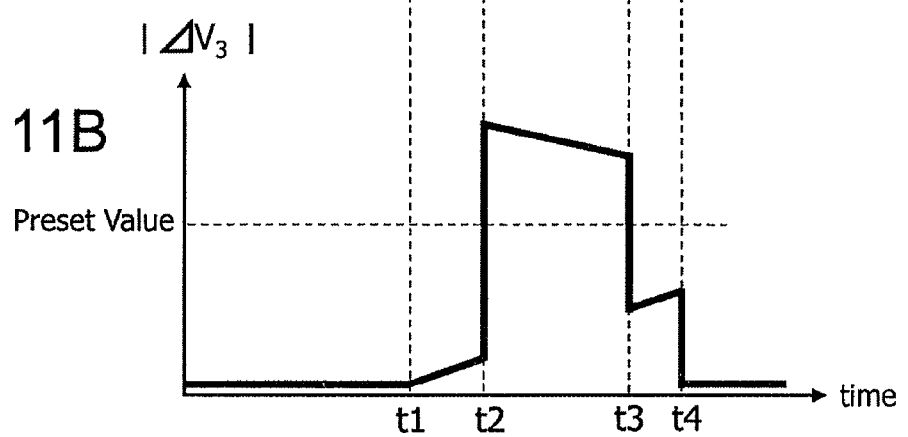

FIG. 11A and FIG. 11B are examples of time charts when the flowchart in FIG. 9 is executed.

It is supposed that, as in FIG. 11A, at time t1 during a discharge of battery systems 252, a battery system 205 related to the battery voltage V2 has some troubles. When it is determined that the closing or opening devices 234, 235 should be opened based on a requirement for replacement, the battery pack 252 related to the battery voltage V2 is separated from the main power supply line. As a result, as in FIG. 11A, a difference in voltage V2 vanishes.

As in FIG. 11A and FIG. 11B, when the replacement begins in the battery pack 252 at time t2, the voltage across the battery pack 252 is temporarily unstable until the replacement is finished at time t3. After the replacement is finished, ΔV3 which is the difference in voltage between the voltage across the replaced battery pack 252 and the voltage across the battery pack 252 connected to the main power supply line is compared with a preset value. When it is determined that ΔV3 is not more than the preset value, the closing or opening device related to the replaced battery pack 252 is closed. This allows the main power supply line to be connected to the replaced battery pack 252.

[Configuration, Functions and Effects of Battery System 205 of the Second Embodiment]

The battery system 205 in accordance with the second embodiment premises a battery system 205 in which the battery module 314 in which a plurality of battery cells 310 are connected in series is connected to the main power supply line.

As in FIG. 7, the battery system 205 in accordance with the second embodiment includes the closing or opening devices 234, 235, which are provided on the relaying path 251, which connects the positive electrode side terminal 248 on the main power supply line to the positive electrode side terminal 250 of the terminals connected to the battery module 314. The closing or opening devices 234, 235 serve to open or close the relaying path 251.

Also, as in FIG. 7, the battery system 205 of the second embodiment includes the voltage detection unit 401 that detects each of the voltage at the positive electrode side terminals 248 of the main power supply line and the voltage at the positive electrode side terminals 250 of the terminal section, and the switching control unit 403 that compares the voltage detected by the voltage detection unit 401 at the positive electrode side terminal 248 of the main power supply line with the voltage at the positive electrode side terminal 250 of the terminals to determine which is large or small, determines whether the difference in voltage between them is not more than a preset value, and controls the closing or opening operations of the closing or opening devices 234, 235, based on the determination.

In the battery system 205 of the second embodiment, when there is a difference in voltage from the power system 104 that is more than the preset value, it is considered that there is a possibility that damage to the closing or opening devices such as breakages of the devices due to the rush current flowing is caused in the system, so that the closing or opening devices 234, 235 are opened (to supply power to the battery packs 252). On the other hand, if the difference in voltage from the power system 104 falls in a range of the preset vale, it is considered that the possibility that the system is damaged is low, so that the closing or opening devices 234, 235 are closed (to supply power to the battery packs 252).

According to the battery system 205 of the second embodiment, damage to the closing or opening devices such as breakages of the devices due to the rush current flowing may be prevented from being caused in the system.

What is claimed is:

1. A battery system comprising:
a battery module having a plurality of battery cells being connected;
a battery pack having a plurality of battery modules being connected either in series or in parallel or both in series and in parallel;
a battery block having a plurality of battery packs being connected either in series or in parallel or both in series and in parallel, wherein the battery module, the battery pack and the battery block are mutually layered;
a cell control unit for calculating first differences, where the first differences are among the plurality of battery cells either in electric energy or in a state of charge or both in electric energy and in a state of charge, and operating to reduce the first differences among the plurality of battery cells based on a result calculated by the cell control unit regarding the first differences;
a battery control unit for calculating second differences, where the second differences are among the plurality of battery modules either in electric energy or in a state of charge or both in electric energy and in a state of charge, and performing a controlling operation to reduce the second differences among the plurality of battery modules based on a result calculated by the battery control unit regarding the second differences; and
a pack control unit for calculating third differences, where the third differences are among the plurality of battery packs either in electric energy or in a state of charge or both in electric energy and in a state of charge, and performing a controlling operation to reduce the third differences among the plurality of battery packs based on a result calculated by the pack control unit regarding the third differences.

2. The battery system of claim 1, wherein
the pack control unit refers to a target parameter set up based on the result calculated by the pack control unit regarding the third differences among the plurality of battery packs, thereby, to perform a controlling operation to reduce the third differences,
the battery control unit refers to a target parameter set up based on the result calculated by the battery control unit regarding the second differences among the plurality of battery modules, thereby, to perform a controlling operation to reduce the second differences, and
the cell control unit refers to a target parameter set up based on the result calculated by the cell control unit regarding the first differences among the plurality of battery cells, thereby, to operate to reduce the first differences.

3. The battery system of claim 1, further comprising
a battery block control unit for calculating fourth differences among a plurality of battery blocks either in electric energy or in a state of charge or both in electric energy and in a state of charge and performing a controlling operation to reduce the fourth differences among the plurality of battery blocks based on a result calculated by the battery block control unit regarding the fourth differences.

4. The battery system of claim 3, wherein
the battery blocks are connected either in series or in parallel or both in series and in parallel.

5. The battery system of claim 2, wherein
the battery block includes a closing or opening device that is provided in a relaying path connecting a positive electrode side terminal on a main power supply line of the battery system with a positive electrode side terminal of a power supply circuit for the plurality of the battery blocks, the closing or opening device operating to close or open the relaying path, and
the battery block control unit controls a closing or opening operation of the closing or opening device based on the result calculated by the battery block control unit regarding the fourth differences among the plurality of battery blocks.

6. The battery system of claim 5, further comprising
a manual breaker manually operated to disconnect the battery blocks electrically from the main power supply line of the battery system.

7. The battery system of claim 5, further comprising
a voltage detection unit for detecting a voltage at the positive electrode side terminal of the main power supply line and a voltage at the positive electrode side terminal of a power supply circuit for the battery packs, wherein
the battery block control unit includes a closing or opening control unit for comparing a voltage detected by the voltage detection unit at the positive electrode side terminal of the main power supply line with a voltage at the positive electrode side terminal of the power supply circuit, determining whether a difference in voltage at the both terminals is a preset value and less than the preset value, or not, and controlling a closing or opening operation of the closing or opening device, based on a result of the determination.

8. The battery system of claim 7, wherein
the closing or opening control unit controls the closing or opening device to be closed, when the difference in voltage at the both terminals is not more than the preset value, as a result of the determination.

9. The battery system of claim 7, wherein
the closing or opening control unit controls the closing or opening device to be opened, when the difference in voltage at the both terminals is more than the preset value, as a result of the determination.

* * * * *